Jan. 1, 1924.
T. J. DRAKE
BUNDLE OR SHOCK COMPRESSOR AND HOLDER
Filed Nov. 12, 1921
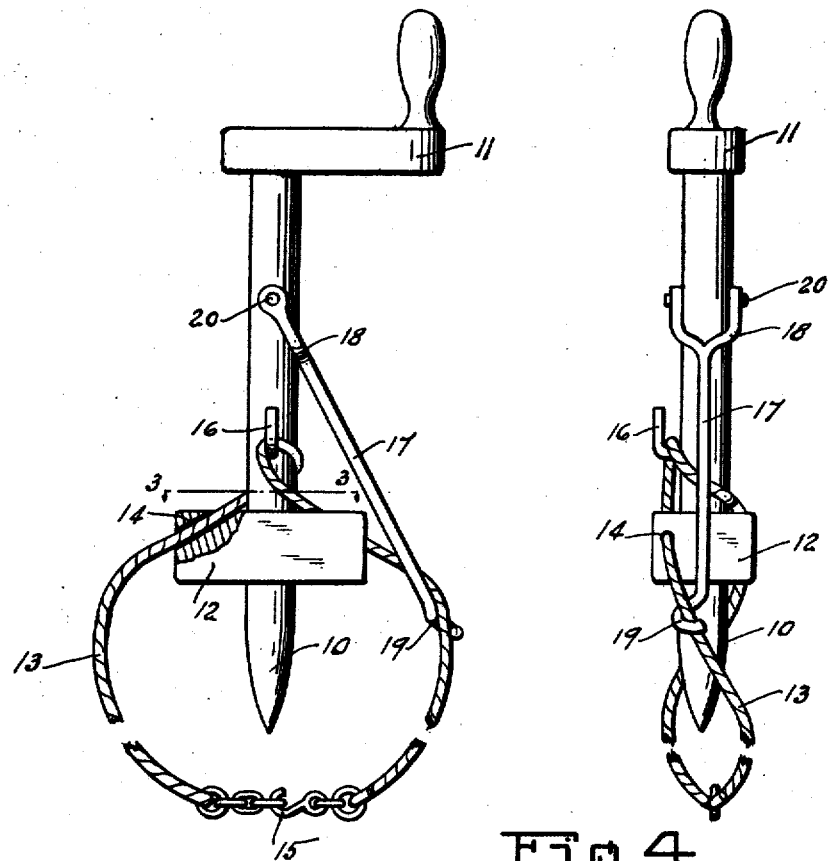
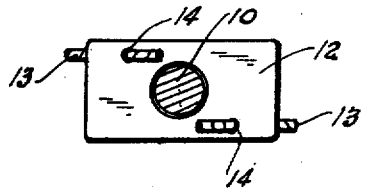
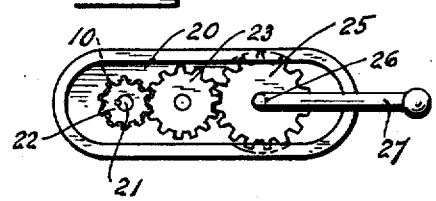
Inventor
Thomas J. Drake
By Watson E. Coleman Attorney Patented Jan. 1, 1924.

1,479,461

UNITED STATES PATENT OFFICE.

THOMAS J. DRAKE, OF SADIEVILLE, KENTUCKY.

BUNDLE OR SHOCK COMPRESSOR AND HOLDER.

Application filed November 12, 1921. Serial No. 514,778.

*To all whom it may concern:*

Be it known that I, THOMAS J. DRAKE, a citizen of the United States, residing at Sadieville, in the county of Scott and State of Kentucky, have invented certain new and useful Improvements in Bundle or Shock Compressors and Holders, of which the following is a specification, reference being had to the accompanying drawings.

This invention relates to devices for compressing shocks of corn, bundles of fodder, sheaths, and the like.

The general object of this invention is to provide a very simple device whereby shocks or bundles may be compressed and held while being tied, and to provide improved means whereby the compressing device may be locked in place during the time when a cord or rope is being passed around the bundle and being tied.

Other objects will appear in the course of the following description.

My invention is illustrated in the accompanying drawings, wherein:—

Figure 1 is a side elevation of a bundle or shock compressor or holder constructed in accordance with my invention;

Figure 2 is an elevation taken at right angles to Figure 1;

Figure 3 is a section on the line 3—3 of Figure 1;

Figure 4 is a top plan view of a compressing device such as I have described but showing a means whereby multiplying gears may be used to secure a rotation of the spike.

Referring to these drawings, 10 designates a spike or shank which is preferably pointed, which is circular in cross section, and which is provided at one end with a crank handle 11. The shank or spike 10 passes loosely through a block 12. Through this block a rope 13 passes. This rope passes through passages 14 in the block, and the ends of the rope are connected to each other by means of a detachable shackle 15 of any suitable construction but illustrated as a section of a chain provided at one end with a hook and at the other with an eye. The rope 13 at its end inward of the block 12 is looped over a hook 16 projecting from the shank or spike 10 and having the bill of the hook extending parallel to the shank. Pivotally mounted upon the shank or spike 10 is a latch 17, one end of which is forked, as at 18, to embrace the spike, the other end being formed with a hook 19 to engage around the rope. This latch 17 is pivoted to the shank by means of a transverse bolt or pin 20.

In the operation of this device, the block with the rope threaded therethrough is disposed upon the spike 10. The spike 10 is then forced into the bundle of hay, fodder, corn or the like and the ends of the rope are passed around the bundle to be formed and engaged with each other by the shackle 15. The loop formed in the rope 13 inward of the block 12 is then engaged by the hook 16. Then as the crank handle 11 is rotated, the cord will commence to wind up on the shank and around the shank and this cord or rope will be gradually tightened on the shock or bundle, the spike being forced outward by the strain on the cord and the block 12 tightening against the bundle. This operation is continued until the bundle has been brought to suitable dimensions for tying, and then the latch 17 is engaged, as illustrated, beneath the rope on one side or the other of the spike 10. The engagement of the hook 19 of the latch with the rope prevents any reverse rotation of the spike and prevents the rope 13 from untwisting from the spike. A cord, rope or other binding material may be then passed around the shock or spike and tied so as to hold the shock in its compressed condition. The shock forming and compressing device is then removed from the shock for further use.

It is obvious that this device is very simple, that it may be quickly operated, and that it places great compressing strain upon the bundle. Inasmuch as the rope winds up on the shank or spike, a great power may be secured upon this rope so as to compress the shock or bundle with relatively little effort. It will be seen that in this device the rope passes directly through apertures in the block 12 so that the rope cannot be detached from the block 12 or slip off this block, and that by inclining these apertures toward the center of the block, the loop of the rope is disposed closely adjacent the shank 10 and thus winds more readily upon this shank and with less power.

In Figure 4 I have illustrated means whereby the spike may be rotated through a train of gears instead of a crank handle, it being understood, however, that the train of gears is operated by a crank handle.

In this Figure, 20 designates an arm or support in which the stub 21 of the spike 10 (shown in dotted lines in Figure 4) is rotatably mounted. Carried upon this stub 21 is a gear wheel 22 which meshes with a relatively larger gear wheel 23 mounted for rotation on the arm or support 20, which in turn meshes with a relatively larger gear wheel 25 mounted on said arm, the shaft 26 of this gear wheel being provided with a crank arm 27.

It will be obvious that with this construction the support 20 may be used in the same manner as the crank arm 11 by holding the crank 27 from movement, which will lock the gears together, but that if it be desired to apply power to the spike it is only necessary to rotate the crank arm 27 in order to secure a proper rotation of the spike, which will wind the cable 13 up upon the spike in the manner heretofore described. It will be seen that in both forms of my device, I have provided a handle whereby the spike may be rotated either directly or through intermediate gears.

I claim:—

1. A device of the character described including a rotatable shank having a handle whereby it may be rotated, a block through which said shank rotates and slides, a rope extending through the block and formed to provide a loop inward of the block, means to detachably connect the ends of the rope outwardly of the block, a hook on the shank inward of the block and adapted to engage said loop, and a latch rod pivoted at one end to the shank and having a hook at its other end whereby it may be engaged with the rope to hold the shank from rotation relative to the block and rope.

2. A shock compressor including a rotatable shank, a slide member loose on said shank, a looped flexible bundle engaging member slidably engaging the slide member and attached to the shank, and a latch rod pivoted at one end to the shank and having a hook at its other end whereby it may be engaged with the flexible member to hold the shank from rotation relative to the slide member and the flexible member.

In testimony whereof I hereunto affix my signature.

THOMAS J. DRAKE.